US007386622B2

(12) United States Patent
Tanaka

(10) Patent No.: US 7,386,622 B2
(45) Date of Patent: Jun. 10, 2008

(54) NETWORK CONVERTER AND INFORMATION PROCESSING SYSTEM

(75) Inventor: Atsushi Tanaka, Saitama (JP)

(73) Assignee: Hitachi, Ltd.

( * ) Notice: Subject to any disclaimer, the term of this patent is extended or adjusted under 35 U.S.C. 154(b) by 859 days.

(21) Appl. No.: 10/817,032

(22) Filed: Apr. 2, 2004

(65) Prior Publication Data

US 2005/0086444 A1    Apr. 21, 2005

(30) Foreign Application Priority Data

Oct. 1, 2003   (JP) ............................. 2003-343479

(51) Int. Cl.
   *G06F 15/16* (2006.01)
(52) U.S. Cl. ...................... 709/230; 711/163; 711/202; 711/114; 711/152; 726/1; 710/36
(58) Field of Classification Search ................ 709/230, 709/249, 215, 220; 711/152; 370/466; 714/5; 710/305; 707/104.1
   See application file for complete search history.

(56) References Cited

U.S. PATENT DOCUMENTS

| | | | | |
|---|---|---|---|---|
| 6,400,730 | B1* | 6/2002 | Latif et al. ................... | 370/466 |
| 6,683,883 | B1 | 1/2004 | Czeiger | |
| 6,766,412 | B2 | 7/2004 | Bolt | |
| 6,895,461 | B1* | 5/2005 | Thompson .................. | 710/305 |
| 7,107,328 | B1* | 9/2006 | Muthiyan et al. ........... | 709/220 |
| 7,188,194 | B1* | 3/2007 | Kuik et al. .................. | 709/249 |
| 7,200,610 | B1* | 4/2007 | Prawdiuk et al. ......... | 707/104.1 |
| 7,260,737 | B1* | 8/2007 | Lent et al. ..................... | 714/5 |
| 7,272,848 | B1* | 9/2007 | Meyer et al. ................... | 726/1 |
| 7,293,152 | B1* | 11/2007 | Srinivasan et al. ......... | 711/202 |
| 2002/0099797 | A1 | 7/2002 | Merrell et al. | |
| 2003/0014600 | A1* | 1/2003 | Ito et al. ...................... | 711/152 |
| 2003/0031187 | A1 | 2/2003 | Hefferman et al. | |
| 2003/0084219 | A1 | 5/2003 | Yao et al. | |
| 2003/0093541 | A1* | 5/2003 | Lolayekar et al. .......... | 709/230 |
| 2003/0140193 | A1 | 7/2003 | Acharya et al. | |

(Continued)

FOREIGN PATENT DOCUMENTS

JP       2000-276406       10/2000

(Continued)

OTHER PUBLICATIONS

European Patent Office Examination Report dated Aug. 31, 2006 for European patent application EP04007980.8 (Aug. 2006).

(Continued)

*Primary Examiner*—Dustin Nguyen
(74) *Attorney, Agent, or Firm*—Townsend and Townsend and Crew LLP

(57) ABSTRACT

A network converter connected to an information processing device and a storage device so as to be communicable including a conversion table storage section which stores combinations of iSCSI names of the information processing device and the storage device and WWNs (World Wide Name) of the information processing device and the storage device in a conversion table, a first identification number conversion section which converts the iSCSI names into the WWNs according to contents stored in the conversion table, and a second identification number conversion section which converts the WWNs into the iSCSI names according to contents stored in the conversion table.

8 Claims, 7 Drawing Sheets

U.S. PATENT DOCUMENTS

| | | |
|---|---|---|
| 2003/0145045 A1 | 7/2003 | Pellegrino |
| 2003/0145116 A1 | 7/2003 | Moroney |
| 2003/0149829 A1 | 8/2003 | Basham et al. |
| 2003/0236837 A1 | 12/2003 | Johnson et al. |
| 2004/0019686 A1 | 1/2004 | Toyoda et al. |
| 2004/0139240 A1 | 7/2004 | DiCorpo |
| 2004/0148376 A1 | 7/2004 | Rangan et al. |
| 2005/0066045 A1* | 3/2005 | Johnson et al. ............. 709/230 |

FOREIGN PATENT DOCUMENTS

| | | |
|---|---|---|
| JP | 2002-014777 A | 1/2002 |
| JP | 2002-318725 | 10/2002 |
| JP | 2003-242039 A | 8/2003 |
| WO | WO/03027886 A1 | 4/2003 |

OTHER PUBLICATIONS

Japan Patent Office (JPO) office action dated Nov. 13, 2007 for JPO patent application JP2003-343479.

Julian Salran, Kalman Meth, IBM "IP Storage working Group iscs1", Jan. 19, 2003.

CISCO, "Cisco SN5428 Storage Router Software Configuration Guide, Chapter 1" SN 5428 Storage Router Overview, www.ietf.org, date unknown.

European Patent Office Examination Report dated Aug. 30, 2007 for European patent application EP04007980.8 (Aug. 2007).

\* cited by examiner

| iSCSI NAME | Node_Name(WWN) | N_Port_Name(WWN) | |
|---|---|---|---|
| INFORMATION PROCESSING DEVICE #1 | 01020304 | 0101ABCD | ~27 |
| INFORMATION PROCESSING DEVICE #2 | 030A0B0C | 0201EF01 | |
| ⋮ | ⋮ | ⋮ | |
| STORAGE DEVICE #1 | 0A010203 | 0A020100 | |
| ⋮ | ⋮ | ⋮ | |
| default | FFFFFFFF (ACCESS DISABLED) | FFFFFFFF (ACCESS DISABLED) | |

Fig. 2

| Node_Name(WWN) | N_Port_Name(WWN) | LUN0 | LUN1 | ⋯ | LUNn | |
|---|---|---|---|---|---|---|
| 01020304 | 0101ABCD | 1 | 0 | ⋯ | 0 | ~35 |
| 030A0B0C | 0201EF01 | 0 | 1 | ⋯ | 1 | |
| ⋮ | ⋮ | ⋮ | ⋮ | ⋯ | ⋮ | |
| FFFFFFFF (ACCESS DISABLED) | FFFFFFFF (ACCESS DISABLED) | 0 | 0 | ⋯ | 0 | |

Fig. 3

NETWORK CONVERTER AND INFORMATION PROCESSING SYSTEM

CROSS-REFERENCE TO RELATED APPLICATIONS

The present application claims priority upon Japanese Patent Application No. 2003-343479 filed on Oct. 1, 2003, which is herein incorporated by reference.

BACKGROUND OF THE INVENTION

1. Field of the Invention

The present invention relates to a network converter and an information processing system.

2. Description of the Related Art

Along with an improved communication speed of a LAN (Local Area Network), there has been rapid advancement in construction of an information processing system which transmits/receives data by using an iSCSI (internet Small Computer Systems Interface) protocol between an information processing device and a storage device. Details of the iSCSI protocol are described in "iSCSI" by Julian Satran and four others ([online], Hei 15(2003) Jan. 19, USA IETF (The Internet Engineering Task Force), [search on Hei 15(2003) Sep. 11], Internet <URL:http://www.ietf.org/internet-drafts/draft-ietf-ips-iscsi-20.txt>).

Also in such an environment, there has arisen a need to effectively use the storage device connected to the information processing device by use of a conventionally used Fibre Channel. Accordingly, a network converter has been used, which converts iSCSI protocol data and Fibre Channel protocol data between each other. As a representative example of the network converter, there is "SN5428 Storage Router" by Cisco Systems, Inc. Details of a method for setting the network converter and the like are described in Cisco Systems Inc., "Cisco SN5428 Storage Router Software Configuration Guide" ([online], Hei 15(2003) Jun. 24, Cisco Systems Inc., [search on Hei 15(2003) Sep. 11], Internet <http://www.cisco.com/japanese/warp/public/3/jp/service/manual_j/rt/5000/28srscg/index.ht ml>).

As shown in FIG. 9, such a network converter includes a protocol conversion section 903 which converts an iSCSI protocol and a Fibre Channel protocol between each other, a WWN (World Wide Name) allocation section 904 and an extended instruction issuing section 905. The protocol conversion section 903 receives an IP packet from an information processing device 901 via a LAN, converts the IP packet into a Fibre Channel frame (hereinafter referred to as a "FC frame") and transmits the FC frame to a storage device 908.

Generally, when the information processing device has access to the storage device, the access is limited from the viewpoint of security. For example, there is LUN security which controls the access of the information processing device for each LUN (Logical Unit Number) that is a management number of a logical volume existing in a disk. In the LUN security, an identification number for identifying the information processing device is required and a WWN (World Wide Name) is often used in the case of the Fibre Channel. Details of the LUN security are described in Japanese Patent Application Laid-Open Publication No. 2000-276406.

It is required to realize the LUN security described above also in the case of the access via the LAN as shown in FIG. 9. Accordingly, a method for identifying the information processing device 901 by the storage device 908 is required. In the above-described "SN5428 Storage Router" by Cisco Systems Inc., the WWN allocation section 904 sequentially allocates WWNs, which are set in a WWN management table 907 stored in a memory 906, to the respective information processing devices 901. Thus, a different WWN may be allocated to the same information processing device 901 for each access. Consequently, it is impossible to realize the LUN security using the WWNs in the storage device 908. Accordingly, the network converter 902 includes the extended instruction issuing section 905 which inserts an iSCSI name of the information processing device into an FC frame. The FC frame is not an instruction prepared in the Fibre Channel protocol. Thus, in order to realize the LUN security using the FC frame, it is required that an extended instruction analysis section 909 which analyzes the frame is provided in the storage device 908. The extended instruction analysis section 909 obtains the iSCSI name of the information processing device from the FC frame and controls the LUN security based on a security management table 911.

In order to realize the LUN security by use of the above-described method, it is required that the extended instruction analysis section 909 and the like are newly provided in the storage device 908. Accordingly, it is required to communicate with the information processing device, which transmits/receives data by use of the iSCSI protocol, in consideration for the LUN security without adding new components and the like to the storage device which transmits/receives data by use of the conventionally used Fibre Channel protocol as described above.

SUMMARY OF THE INVENTION

It is an object of the present invention to provide a network converter and an information processing system which solve the foregoing problems.

A network converter according to one embodiment of the present invention is connected to an information processing device and a storage device so as to be communicable and comprises:

a first protocol conversion section which converts data received from the information processing device according to a first protocol into data having a form determined by a Fibre Channel protocol and transmits the data to the storage device;

a second protocol conversion section which converts data received from the storage device according to the Fibre Channel protocol into data having a form determined by the first protocol and transmits the data to the information processing device;

a conversion table storage section which stores in a conversion table a combination of a first identification number which is a number for identifying the information processing device and the storage device according to the first protocol, and a second identification number which is a number for identifying the information processing device and the storage device according to the Fibre Channel protocol;

a first identification number conversion section which converts the first identification number into the second identification number in accordance with contents stored in the conversion table; and a second identification number conversion section which converts the second identification number into the first identification number in accordance with contents-stored in the conversion table.

Here, the first protocol may be, for example, an iSCSI protocol and the first identification number may be an iSCSI name. Moreover, the second identification number may be, for example, a WWN which is an identification number of the information processing device and the storage device in the Fibre Channel protocol.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 2 is a view showing an example of a conversion table according to the first embodiment;

FIG. 3 is a view showing an example of a security management table according to the first embodiment;

DETAILED DESCRIPTION OF THE INVENTION

At least the following matters will be made clear by the explanation in the present specification and the description of the accompanying drawings.

First Embodiment

Figure 1:
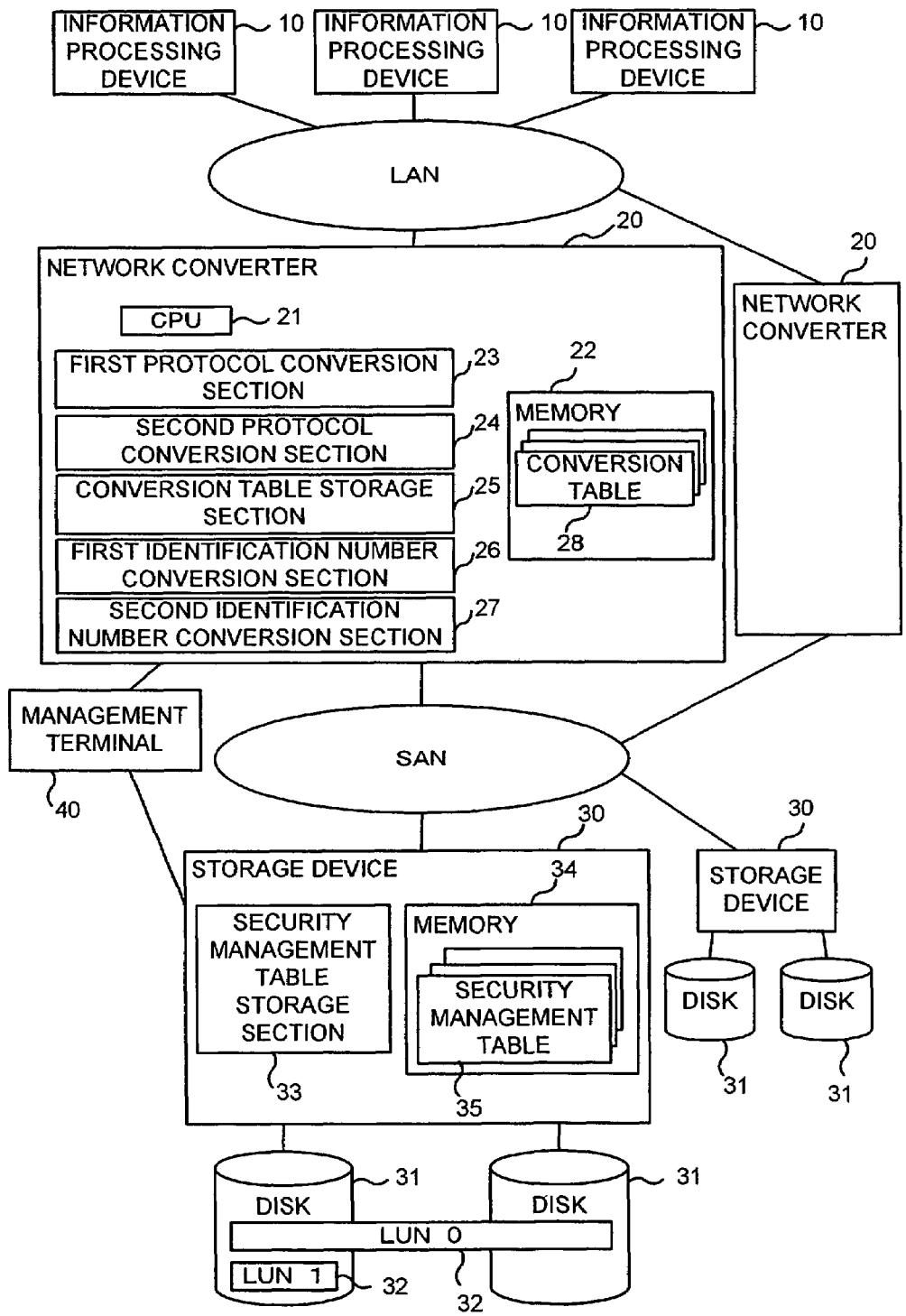
FIG. 1 is a block diagram showing an example of an entire information processing system according to a first embodiment.

First, FIG. 1 shows a block diagram of an entire configuration example of an information processing system including network converters 20 according to a first embodiment of the present invention.

The information processing system according to this embodiment includes information processing devices 10, the network converters 20, storage devices 30 and a management terminal 40.

Information Processing Device

The information processing device 10 is a computer including a CPU (Central Processing Unit) and a memory. The CPU included in the information processing device 10 executes various programs. Thus, various types of processing are realized. The information processing device 10 is utilized, for example, as a central computer in an ATM (Automated Teller Machine) system of a bank, a seat reservation system of an airline company and the like. The information processing device 10 can be implemented also as a mainframe computer and a personal computer.

Moreover, the information processing device 10 is connected to the network converter 20 via a LAN so as to be communicable and transmits a data I/O request for the storage device 30 to the network converter 20. As the data I/O request, there are, for example, a data read request, a data write request and the like. Note that the information processing device 10 communicates with the network converter 20 by use of an iSCSI protocol. As described above, the information processing device 10 according to this embodiment may be a conventional information processing device 10 capable of communicating using the iSCSI protocol. Thus, it is not required to add new components and the like.

Network Converter

The network converter 20 is connected to the information processing device 10 via the LAN so as to be communicable and is connected to the storage device 30 via a SAN (Storage Area Network) so as to be communicable. In this embodiment, the SAN is a network in which communications are performed in accordance with a Fibre Channel protocol. Moreover, the network converter 20 is connected to the management terminal 40 so as to be communicable.

The network converter 20 includes a CPU 21, a memory 22 and the like. The network converter 20 further includes a first protocol conversion section 23, a second protocol conversion section 24, a conversion table storage section 25, a first identification number conversion section 26, a second identification number conversion section 27 and the like, all of which are controlled by the CPU 21. Note that the first and second protocol conversion sections 23 and 24 may be included in one protocol conversion section and the first and the second identification number conversion sections 26 and 27 may be also included in one identification number conversion section.

Furthermore, these conversion sections may be realized as software which is defined as a computer software program executed by the CPU 21.

A Combination of an identification number of the information processing device 10 and the storage device 30 according to the iSCSI protocol and the Fibre Channel protocol is stored in a conversion table 28 in the memory 22. Here, the identification number according to the iSCSI protocol is an iSCSI name and the identification numbers according to the Fibre Channel protocol are an Node_Name and an N_Port_Name which are WWNs (World Wide Name).

The first protocol conversion section 23 converts a data I/O request for the storage device 30 according to the iSCSI protocol received from the information processing device 10 into an FC frame of the Fibre Channel protocol and transmits the FC frame to the storage device 30. When the first protocol conversion section 23 converts an IP packet into an FC frame, the first identification number conversion section 26 converts iSCSI names of the information processing device 10 and the storage device 30 into WWNs.

Moreover, the second protocol conversion section 24 converts a response to a data I/O request according to the Fibre Channel protocol received from the storage device 30 into an IP packet of the iSCSI protocol and transmits the IP packet to the information processing device 10. When the second protocol conversion section 24 converts an FC frame into an IP packet, the second identification number conversion section 27 converts WWNs of the information processing device 10 and the storage device 30 into iSCSI names.

Upon receipt of combinations of the iSCSI names and WWNs of the information processing device 10 and the storage device 30 from the management terminal 40, the conversion table storage section 25 stores the combinations in the conversion table 28.

Storage Device

The storage device 30 is connected to the network converter 20 via the SAN so as to be communicable. The storage device 30 includes a controller 39 and a plurality of disks 31. In the disks 31 are set logical volumes 32. The logical volume 32 is a logical storage area including a physical storage area the disk 31 has. Note that a LUN (Logical Unit Number) is given to each of the logical volumes 32. Moreover, the controller 39 includes a security management table 35 in a memory 34. Furthermore, the controller 39 includes a security management table storage section 33. This storage section 33 may be realized by making a CPU included in the controller 39 execute computer software programs or may be realized by use of dedicated hardware.

The security management table 35 stores access enable/disable to the logical volumes for each of the information processing devices 10 accessing the storage devices or for each of the WWNs of the storage devices 30. FIG. 3 shows an example of the security management table. In columns of the WWNS, WWNs of the information devices 10 accessing the storage devices or those of the storage devices 30 are set. Moreover, in columns of LUN0 to LUNn, access enable/disable for the respective LUNs of the logical volumes is set. Here, "1" indicates that the access is enabled and "0" indicates that the access is disabled. The storage device 30 realizes LUN security that is an access control for each LUN by use of this security management table 35.

The storage device 30 according to this embodiment may be a conventional storage device 30 which performs communications according to the Fibre Channel protocol and performs the LUN security. Thus, it is not required to newly add components and the like.

Management Terminal

The management terminal 40 includes a CPU, an input unit, a display unit, an identification number conversion notification section, an access enable/disable notification section and the like and is a computer connected to the network converter and the storage device so as to be communicable. Note that the management terminal 40 may be connected to a plurality of network converters 20 and a plurality of storage devices 30. Moreover, the management terminal 40 can be built into the network converter 20 or the storage device 30.

The identification number conversion notification section notifies the conversion table storage section 25 included in the network converter 20 of the combination of the iSCSI name and the WWN, which is stored in the conversion table. Moreover, the access enable/disable notification section notifies the security management table storage section 33 included in the storage device 30 of the LUN access enable/disable for each WWN, which is stored in the security management table.

Figure 4:
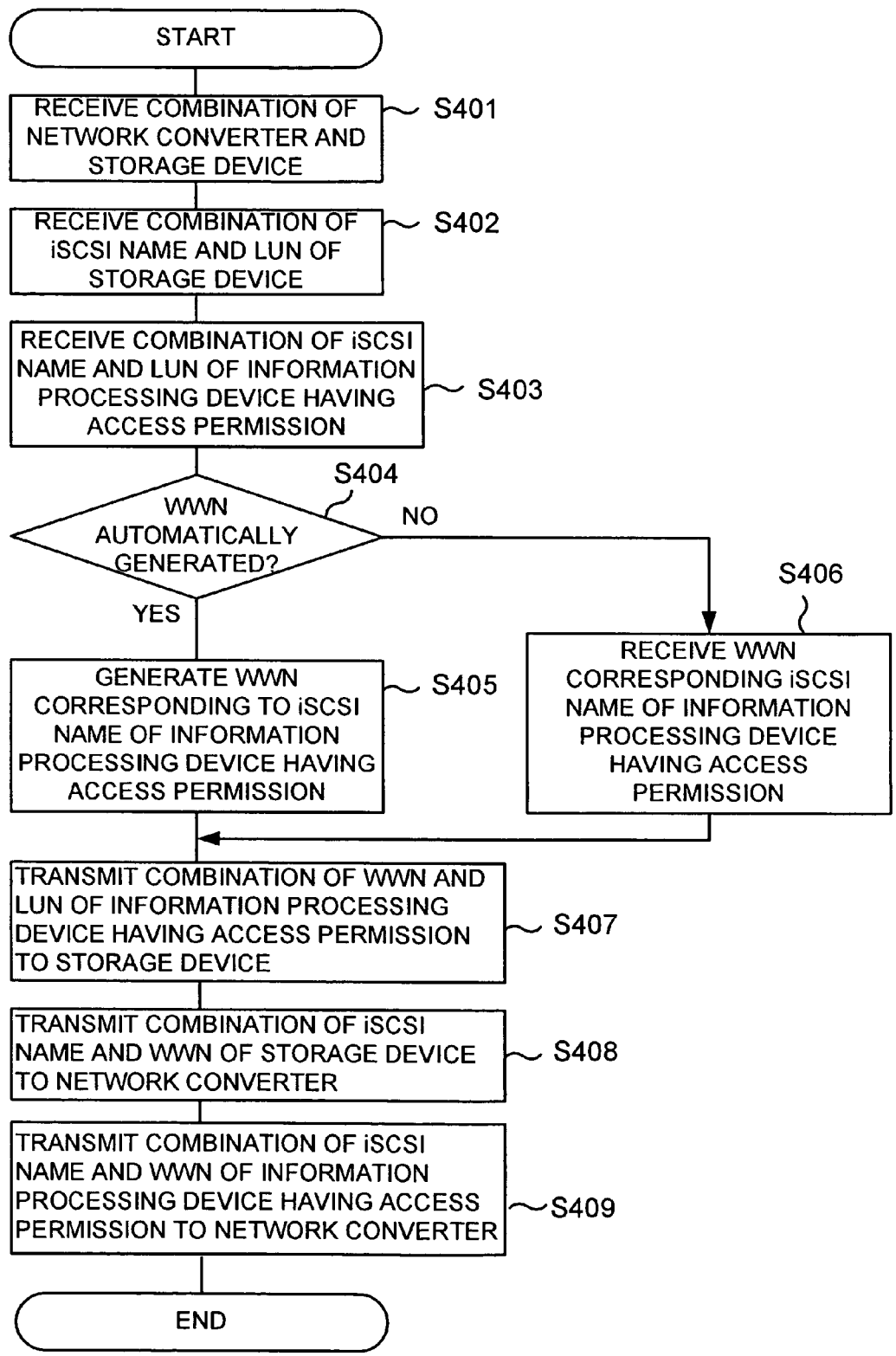
FIG. 4 is an example of a flowchart of a management terminal according to the first embodiment.

The management terminal 40 will be described in detail with referring to a flowchart of FIG. 4.

First, the management terminal 40 receives a combination of a target network converter 20 and a target storage device 30 from the input unit (S401). Thereafter, the management terminal 40 receives a combination of an iSCSI name and a WWN of the selected storage device 30 from the input unit (S402). Furthermore, the management terminal 40 receives a combination of an iSCSI name and a LUN of the information processing device 10, for which access is enabled, from the input unit (S403). Subsequently, the management terminal 40 selects whether or not a WWN of the information processing device is automatically generated (S404). In the case of automatically generating the WWN, the management terminal 40 automatically generates the WWN of the information processing device 10, for which the access is enabled (S405). As to a method for automatically generating the WWN, numbers within a fixed range may be allocated sequentially or randomly as long as a different WWN is allocated to each of the information processing devices 10. In the case of not automatically generating the WWN, the management terminal 40 receives a WWN of the information processing device 10, for which the access is enabled, from the input device (S406).

Next, the management terminal 40 associates the WWN allocated to the information processing device 10, for which the access is enabled, with the LUN which can be accessed by the information processing device 10 that is previously inputted. Thereafter, the access enable/disable notification section of the management terminal 40 transmits a combination of the WWN and the LUN of the information processing device 10, for which the access is enabled, to the security management table storage section 33 of the storage device 30 (S407). In this event, the access enable/disable notification section transmits a WWN which controls access denial to the security management table storage section 33 so that access to the WWN for all LUNs is disabled. Here, the WWN which controls the access denial is, for example, "FFFFFFFF" or the like.

Upon receipt of the combination described above, the security management table storage section 33 of the controller 39 stores the combination in the security management table 35 so as to permit access for the received combination of the WWN and the LUN. Specifically, for each of the received WWNS, "1" is set to the LUN for which access is enabled and "0" is set to the LUN not received for the WWN. Moreover, regarding the WWN which controls the access denial, the security management table storage section 33 sets "0" to all the LUNs for the WWN.

Next, the identification number conversion notification section of the management terminal 40 transmits the combination of the iSCSI name and the WWN of the storage device 30 to the conversion table storage section 25 of the network converter 20 (S408). Upon receipt of the combination described above, the conversion table storage section 25 stores the received combination of the iSCSI name and the WWN in the conversion table 28. Moreover, the management terminal 40 associates the WWN allocated to the information processing device 10 with the previously received iSCSI name of the information processing device 10. Accordingly, the identification number conversion notification section transmits the combination of the iSCSI name and the WWN of the information processing device 10, for which the access is enabled, to the conversion table storage section 25 (S409). In this event, the identification number conversion notification section also transmits the above-described WWN which controls the access denial to the conversion table storage section 25. Upon receipt of the combination, the conversion table storage section 25 stores the received combination of the iSCSI name and WWN in the conversion table 28. Moreover, the conversion table storage section 25 stores the WWN which controls the access denial in the conversion table 28. This is represented by a record in the conversion table 28 of FIG. 2, in which the iSCSI name is "default" and the WWN is "FFFFFFFF".

Flow of Conversion Processing

Here, a description will be given of processing of converting an IP packet of the iSCSI protocol received from the information processing device 10 into an FC frame and transmitting the FC frame to the storage device 30 in a state where the conversion table 28 and the security management table 35 are stored as described above.

Figure 5:
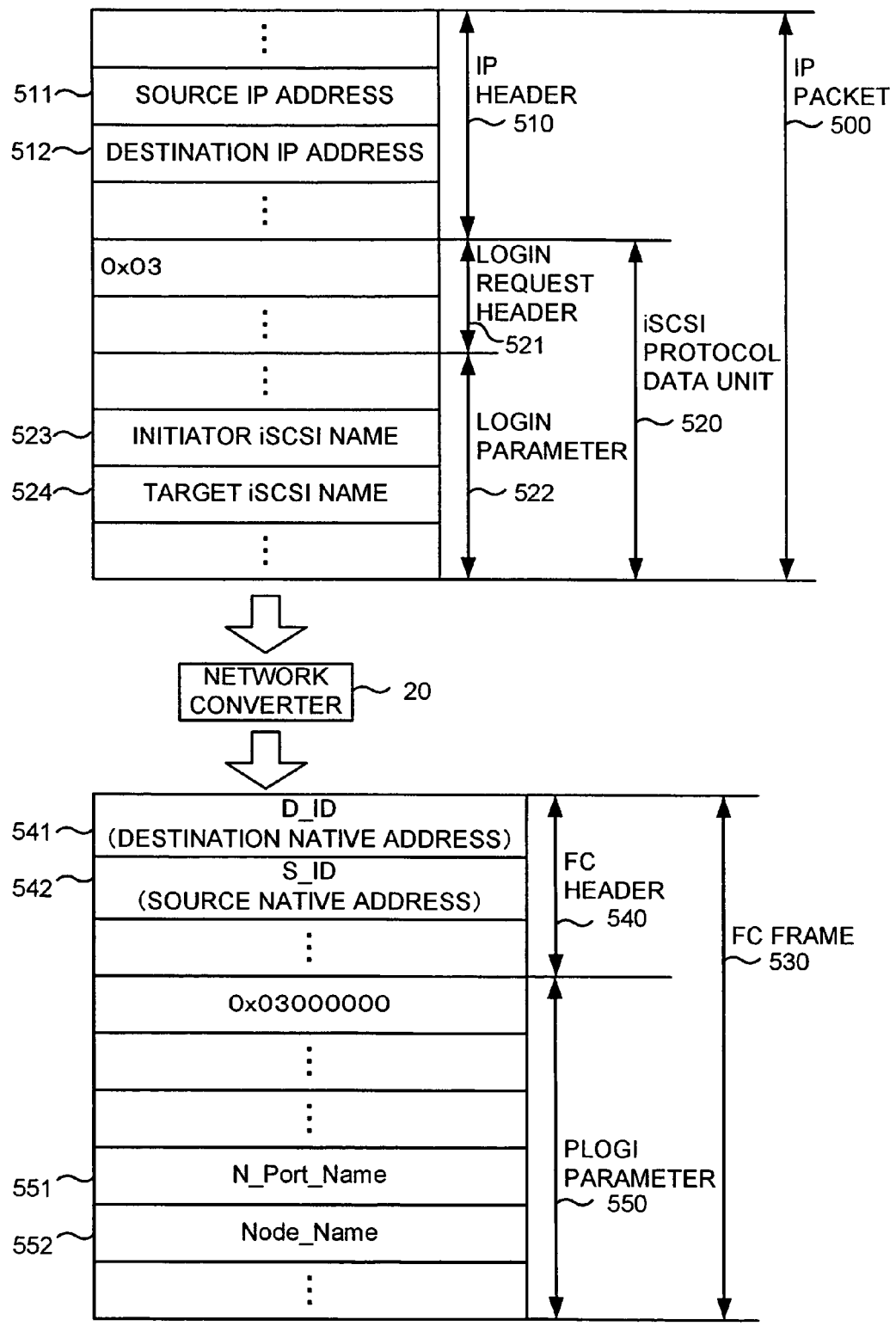
FIG. 5 is a view showing a conversion example from an IP packet into an FC frame in performing login processing of iSCSI according to the first embodiment.

First, the processing will be schematically described with reference to FIG. 5. An IP packet 500 received from the information processing device 10 includes an IP header 510 and an iSCSI protocol data unit 520. The IP header 510 includes a source IP address 511 and a destination IP address 512, which are used for data transfer through the LAN. The source IP address is an IP address of the information processing device 10 and the destination IP address is an IP address of the network converter 20. The iSCSI protocol data unit 520 includes a login request header 521 and a login parameter 522. The login parameter 522 includes an initiator iSCSI name 523 indicating a source in the iSCSI protocol and a target iSCSI name 524 indicating a destination in the iSCSI protocol. The initiator iSCSI name 523 is an iSCSI name of the information processing device 10 and the target iSCSI name 524 is an iSCSI name of the storage device 30.

The network converter 20 converts the IP packet 500 into an FC frame 530. The FC frame 530 includes an FC header 540 and a PLOGI parameter 550. The FC header 540 includes a destination native address 541 (D_ID) and a source native address 542 (S_ID), which are native addresses used for data transfer through the Fibre Channel. The native addresses are allocated, for example, when the information processing device 10, the storage device 30 or the like logs into a fabric of the Fibre Channel, and the like. The PLOGI parameter 550 includes an N_Port_Name 551 and a Node_Name 552 of the information processing device 10 that is the source. Specifically, the network converter 20 converts the initiator iSCSI name 523 of the information processing device 10 into a WWN based on the conversion table 28 and sets the WWN to the N_Port Name 551 and the Node_Name 552 of the FC frame 530. Upon receipt of the FC frame 530, the storage device 30 can determine access enable/disable from the information processing device 10 based on the N_Port_Name 551 and the Node_Name 552.

Figure 6:
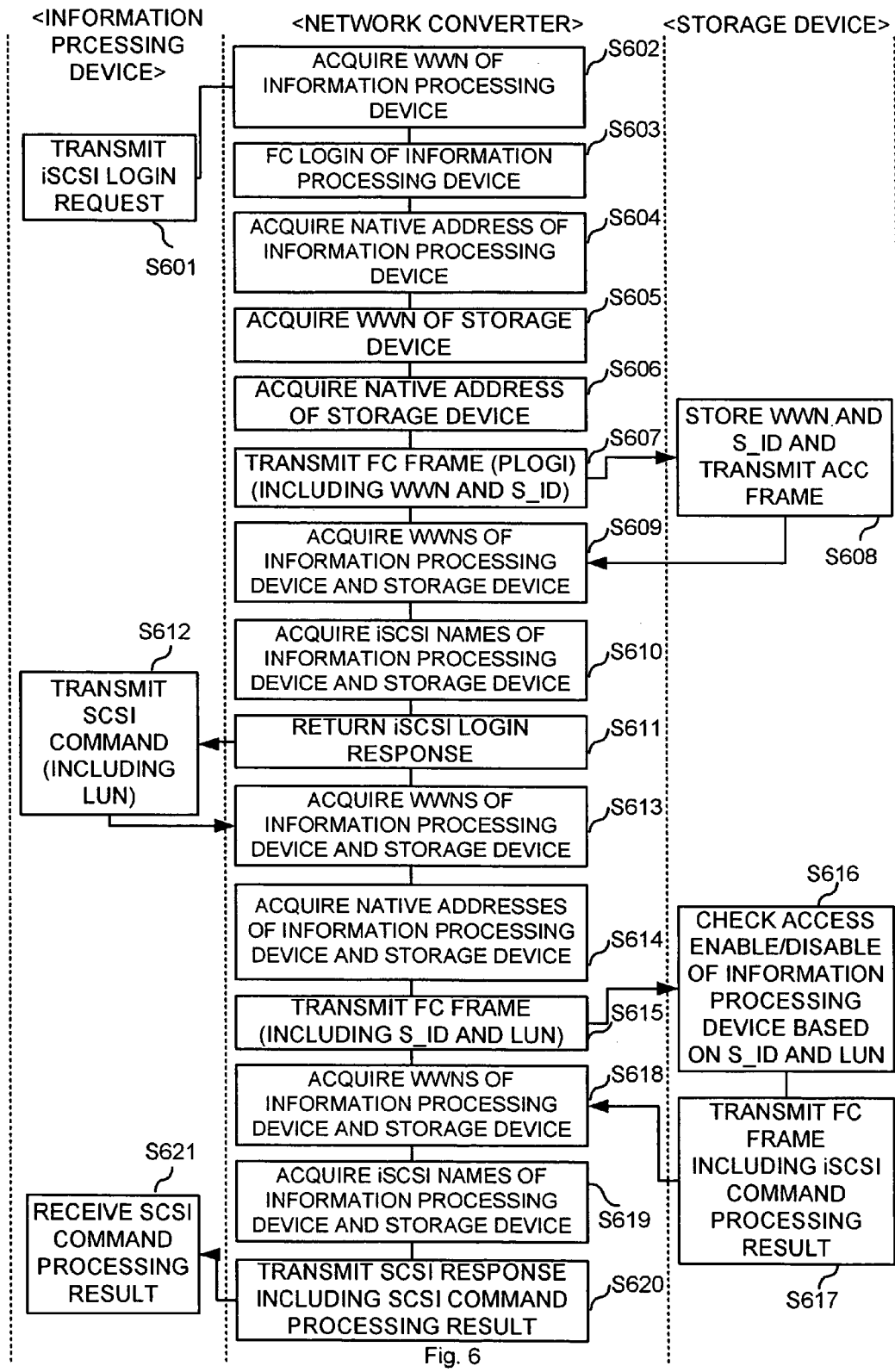
FIG. 6 is an example of a flowchart from login of iSCSI up to execution of a SCSI command in consideration of LUN security according to the first embodiment.

Next, details of the conversion processing will be described with reference to FIG. 6. First, the information processing device 10 transmits the IP packet 500 that is a login request of the iSCSI to the network converter (S601).

The first identification number conversion section 26 of the network converter 20 obtains, from the conversion table 28, a WWN of the information processing device 10, which corresponds to the initiator iSCSI name 523 included in the IP packet 500 (S602). Here, when the initiator iSCSI name 523 is not stored in the conversion table 28, the first identification number conversion section 26 obtains a WWN "FFFFFFFF" which has an iSCSI name "default" and controls access denial. Next, the first protocol conversion section 23 of the network converter 20 allows the information processing device 10 to log into the fabric of the Fibre Channel (S603). Thus, the first protocol conversion section 23 obtains a native address of the information processing device 10 (S604).

Next, the first identification number conversion section 26 acquires, from the conversion table 28, a WWN of the storage device 30, which corresponds to the target iSCSI name 524 included in the IP packet 500 (S605). The first protocol conversion section 23 acquires a native address of the storage device 30 based on the WWN of the storage device 30 (S606). Note that conversion of the WWN into the native address and conversion of the native address into the WWN can be acquired by use of a method such as contacting a name server of the Fibre Channel. The first protocol conversion section 23 forms the FC frame 530 by use of the native addresses of the information processing device 10 and the storage device 30, which are acquired as described above, and the WWN of the information processing device 10 and transmits the FC frame 530 to the storage device 30 (S607).

Figures 7, 8:
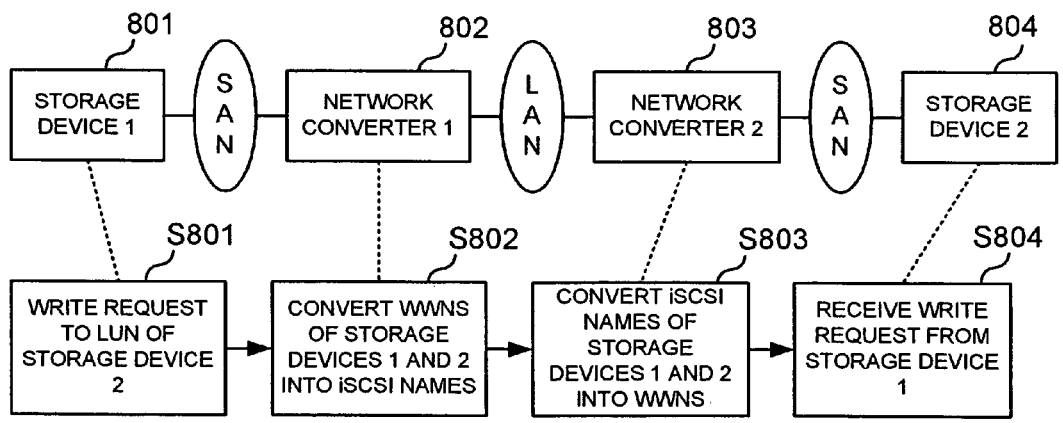
FIG. 7 is a view showing an example of a login information storage table according to the first embodiment.
FIG. 8 is a block diagram showing an example of an entire information processing system according to a second embodiment.
Figure 9:
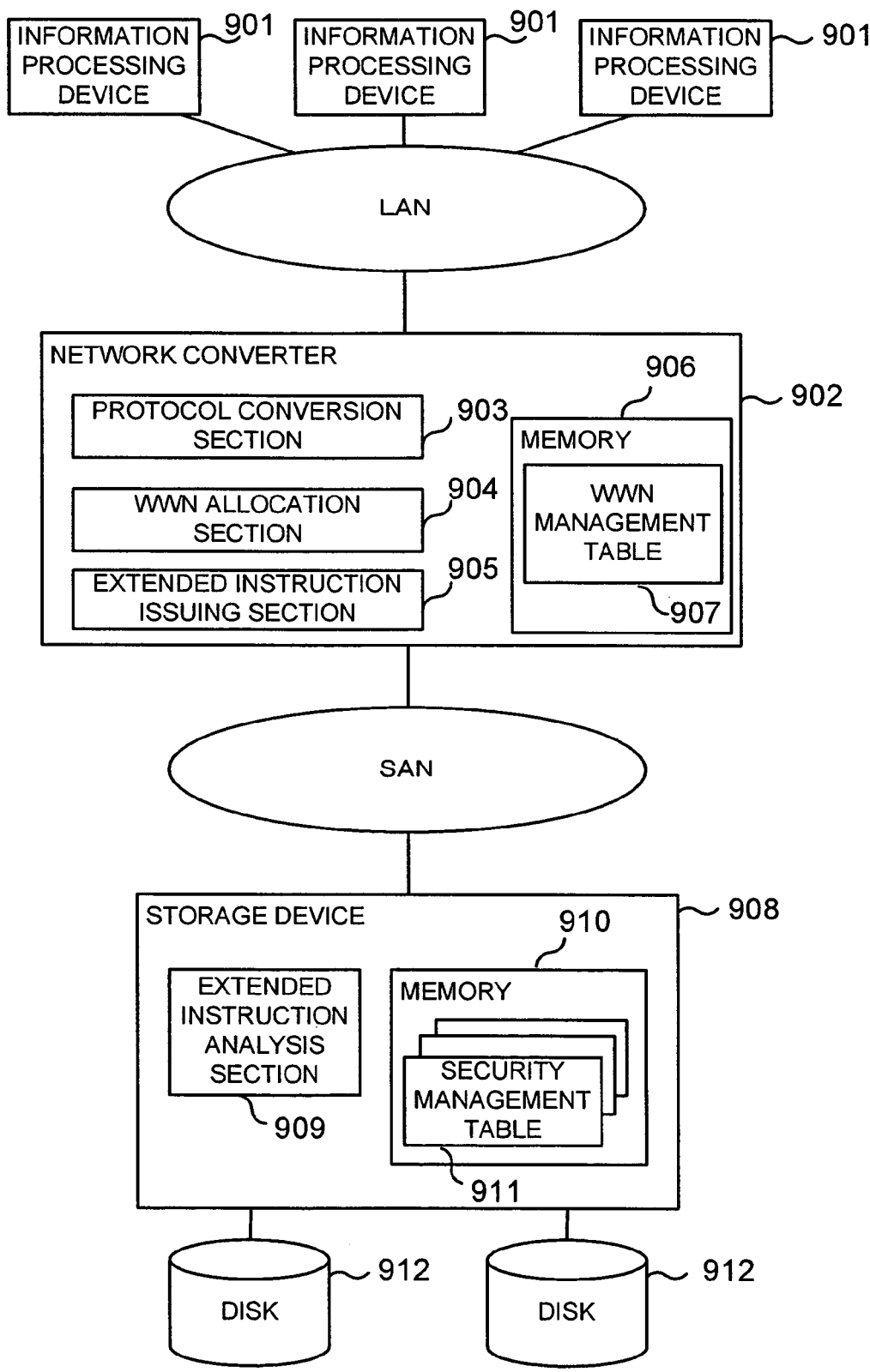
FIG. 9 is a block diagram showing an entire information processing system including a conventional network converter.

Upon receipt of the FC frame 530, the controller 39 of the storage device 30 stores a combination of the WWN and the native address of the information processing device 10 in a login information storage table 701 shown in FIG. 7 and transmits an ACC frame that is a notification of login completion to the network converter 20 (S608).

Upon receipt of the ACC frame, the second protocol conversion section 24 of the network converter 20 acquires WWNs of the information processing device 10 and the storage device 30 based on the native addresses of the information processing device 10 and the storage device 30, which are included in the ACC frame (S609). Next, the second identification number conversion section 27 of the network converter 20 acquires iSCSI names corresponding to the WWNs of the information processing device 10 and the storage device 30 from the conversion table 28 (S610). The second protocol conversion section 24 forms an IP packet that is a login response of the iSCSI, which includes the iSCSI names of the information processing device 10 and the storage device 30, and transmits the IP packet to the information processing device 10 (S611).

Upon receipt of the login response of the iSCSI, the information processing device 10 forms an IP packet including a SCSI command specifying a LUN of an access target and transmits the IP packet to the network converter 20 (S612).

The first identification number conversion section 26 of the network converter 20 acquires, from the conversion table 28, WWNs of the information processing device 10 and the storage device 30, the WWNs corresponding to an initiator iSCSI name and a target iSCSI name which are included in the IP packet (S613). Next, the first protocol conversion section 23 of the network converter 20 acquires native addresses of the information processing device 10 and the storage device 30 based on the WWNs of the information processing device 10 and the storage device 30 (S614). The first protocol conversion section 23 forms an FC frame including the native address of the information processing device 10 and the LUN of the access target and transmits the FC frame to the storage device 30 (S615).

The controller 39 of the storage device 30 acquires a WWN of the information processing device 10 from the login information storage table 701 based on the native address of the information processing device 10, which is included in the FC frame, and checks access enable/disable of the information processing device 10 based on the WWN and the LUN of the access target (S616). The storage device 30 forms an FC frame including a result of processing of the SCSI command and transmits the FC frame to the network converter 20 (S617).

Upon receipt of the FC frame, the second protocol conversion section 24 of the network converter 20 acquires WWNs of the information processing device 10 and the storage device 30 based on the native addresses of the information processing device 10 and the storage device 30, which are included in the FC frame (S618). Next, the second identification number conversion section 27 of the network converter 20 acquires iSCSI names corresponding to the WWNs of the information processing device 10 and the storage device 30 from the conversion table 28 (S619). The second protocol conversion section 24 forms an IP packet that is a result of processing of the SCSI command by use of the iSCSI names of the information processing device 10 and the storage device 30 and transmits the IP packet to the information processing device 10 (S620).

When the information processing device 10 receives the IP packet that is the result of processing of the SCSI command (S621), a series of processing from the login in the iSCSI to the SCSI command execution is completed. Note that, in the series of processing, the processing performed by the information processing device 10 is a normal one in the iSCSI protocol. Thus, by using the network converter 20, it is not required to add new components and the like to the information processing device 10. Similarly, the processing performed by the controller 39 of the storage device 30 is a normal one in the Fibre Channel protocol. Thus, by using the network converter 20, it is not required to add new components and the like to the storage device 30.

As described above, by using the above-described network converter 20, it is possible to communicate with the information processing device 10, which transmits/receives data according to the iSCSI protocol, in consideration of the LUN security without adding new components and the like to the storage device 30 which transmits/receives data according to the conventionally used Fibre Channel protocol. Thus, it is possible to construct an information processing system, which makes effective use of existing resources.

Moreover, the identification number conversion notification section of the management terminal 40 transmits, to the network converter 20, the combination of the iSCSI name and the WWN only for the storage device 30 and the information processing device 10 for which the access to the storage device 30 is enabled. Specifically, the management terminal 40 is not required to generate a combination of an iSCSI name and a WWN for the information processing device 10 for which access is not enabled. Thus, it is possible to prevent unauthorized access to the storage device 30 from the information processing device 10. Moreover, in the conversion table 28 and the security management table 35, only the information processing device 10 having access permission may be stored. Thus, memory resources can be saved.

Second Embodiment

Next, FIG. 8 shows a block diagram of an entire configuration example of an information processing system including a network converter 20 according to a second embodiment.

The information processing system according to this embodiment includes a storage device 1 (801), a network converter 1 (802), a network converter 2 (803) and a storage device 2 (804). The storage device 1 (801) and the network converter 1 (802) are connected to each other via a SAN so as to be communicable. Similarly, the storage device 2 (804) and the network converter 2 (803) are connected to each other via the SAN so as to be communicable. Moreover, the network converter 1 (802) and the network converter 2 (803) are connected to each other via a LAN so as to be communicable. Note that the respective storage devices (801 and 804) have the same configuration as that of the storage device 30 according to the first embodiment. In addition, the respective network converters (802 and 803) have the same configuration as that of the network converter 20 according to the first embodiment.

In such an information processing system, data transmission/reception between the storage devices 1 (801) and 2 (804) in consideration of LUN security according to the Fibre Channel protocol can be performed through the LAN. Here, as an example, a description will be given of a case where the storage device 1 (801) transmits a data write request to the storage device 2 (804). First, the storage device 1 (801) transmits an FC frame of a write request to a LUN of the storage device 2 (804) to the network converter 1 (802) (S801). The network converter 1 (802) transmits an IP packet to the network converter 2 (803), the IP packet including iSCSI names acquired by converting WWNs of the respective storage devices (801 and 804). The network converter 2 (803) transmits an FC frame to the storage device 2 (804), the FC frame including WWNs acquired by converting iSCSI names of the respective storage devices (801 and 804) (S804). Based on the received FC frame, the storage device 2 (804) can execute write processing after determining access enable/disable to the LUN from the storage device 1 (801).

Note that the processing performed by the respective storage devices (801 and 804) in the series of processing is a normal one in the Fibre Channel protocol. Thus, by using the respective network converters (802 and 803), it is not required to newly add components and the like to the respective storage devices (801 and 804).

As described above, by use of the above-described network converters, between the storage devices which transmit/receive data according to the Fibre Channel protocol, data transmission/reception in consideration of LUN security can be performed through the LAN. Specifically, in such cases as when data is backed up between the storage devices, which transmit/receive data according to the Fibre Channel, as a means of disaster recovery, it is possible to use the LAN capable of constructing a long-distance network at lower cost than the SAN.

Although the first and second embodiments have been described above, the foregoing embodiments are for facilitating understanding of the present invention and not for interpreting the present invention by placing limitations thereon. The present invention can be changed and modified without departing from spirit of the invention. In addition, the present invention also includes equivalents thereof.

For example, in the first and second embodiments, the LUN security is performed by using both of the Node_Name and the N_Port_Name. However, the LUN security may be performed by using any one of the Node_Name and the N_Port_Name. In this case, any one of the Node_Name and the N_Port_Name, which is used in the LUN security, may be stored in the conversion table.

Moreover, in the first and second embodiments, the first protocol is the iSCSI protocol. However, the first protocol may be a protocol other than the iSCSI protocol. In this case, combinations of numbers for identifying the information processing device 10 and the storage device 30 according to the protocol and WWNs may be stored in the conversion table 28.

Although the preferred embodiment of the present invention has been described in detail, it should be understood that various changes, substitutions and alterations can be made therein without departing from spirit and scope of the inventions as defined by the appended claims.

What is claimed is:
1. An information processing system comprising:
an information processing device;
a storage device comprising a plurality of storage areas and a storage section storing a security management table for registering information about access enable/ disable to each of the plurality of storage areas from the information processing device;

a network converter connected to the information processing device and the storage device so as to be communicable; and a management terminal connected to the storage device and the network converter so as to be communicable, wherein the network converter further comprises:

a first protocol conversion section which converts data received from the information processing device according to a first protocol into data having a form determined by a Fibre Channel protocol and transmits the data to the storage device;

a second protocol conversion section which converts data received from the storage device according to the Fibre Channel protocol into data having a form determined by the first protocol and transmits the data to the information processing device;

a conversion table storage section which stores in a conversion table a combination of a first identification number which is a number for identifying the information processing device and the storage device according to the first protocol, and a second identification number which is a number for identifying the information processing device and the storage device according to the Fibre Channel protocol;

a first identification number conversion section which converts the first identification number into the second identification number in accordance with contents stored in the conversion table; and a second identification number conversion section which converts the second identification number into the first identification number in accordance with contents stored in the conversion table, wherein the management terminal notifies the storage device of information about correspondence between the identification number of each of the plurality of storage areas and the second identification number of the information processing device for which access is enabled to the storage area, determines a combination of the first identification number and the second identification number related to each of the information processing device and the storage device based on the correspondence information, and notifies the network converter of information about the combination of the first identification number and the second identification number.

2. An information processing system according to claim 1, wherein the management terminal notifies the conversion table storage section of a combination of the first identification number and the second identification number only for the storage device and the information processing device for which access to the storage device is enabled.

3. An information processing system according to claim 2, wherein the first protocol is an iSCSI protocol and the first identification number is an iSCSI name.

4. An information processing system according to claim 3, wherein the second identification number is a Node Name.

5. An information processing system according to claim 3, wherein the second identification number is an N_Port_Name.

6. An information processing system according to claim 3, wherein the second identification number is a combination of the Node Name and the N_Port_Name.

7. An information processing system comprising:

an information processing device;

a storage device comprising a plurality of storage areas and a storage section storing a security management table for registering information about access enable/ disable to each of the plurality of storage areas from the information processing device;

a network converter connected to the information processing device and the storage device so as to be communicable; and a management terminal connected to the storage device and the network converter so as to be communicable, wherein the network converter further comprises:

a first protocol conversion section for converting data received from the information processing device according to a first protocol into data having a form determined by a Fibre Channel protocol and transmits the data to the storage device; a second protocol conversion section for converting data received from the storage device according to the Fibre Channel protocol into data having a form determined by the first protocol and transmits the data to the information processing device;

a conversion table storage section for storing in a conversion table a combination of a first identification number which is a number for identifying the information processing device and the storage device according to the first protocol, and a second identification number which is a number for identifying the information processing device and the storage device according to the Fibre Channel protocol;

a first identification number conversion section for converting the first identification number into the second identification number in accordance with contents stored in the conversion table; and a second identification number conversion section for converting the second identification number into the first identification number in accordance with contents stored in the conversion table, wherein the management terminal comprises:

an input unit;

a processor;

an access enable/disable notification section for notifying information about access enable/disable to each of said plurality of storage areas stored in said security management table to said security management table storage section; and an identification number conversion notification section for notifying a combination of said first identification number and said second identification number related to each of said information processing device and said storage device to said conversion table storage section, said input unit being adapted to receive a first information concerning a combination of said first identification number assigned to said information processing device and a logical unit number assigned to one of said storage areas in said storage device, said processor being adapted to determine said second identification number corresponding to said first identification number based on said first information, said identification number conversion notification section being adapted to transmit a second information concerning a combination of said second identification number and said logical unit number for which access is enabled to said storage device, said identification number conversion notification section further being adapted to transmit a third information concerning a combination of said first identification number and said second identification number for which access is enabled to said network converter.

8. An information processing system according to claim 7, wherein the storage device further comprises:
   a security management table in which the second identification number assigned to an information processing apparatus and/or an other storage device that access the storage device, and information about access enable/disable to each of the plurality of logical unit numbers of the storage areas of the storage device; and
   a security management table storing section for managing the security management table,
   the access enable/disable notification section of the management terminal being adapted to transmit a combination of the second identification number and the logical unit number of the information processing device for which access is enabled to the storage device,
   the security management table storing section being adapted to store in the security management table a logical unit number for which access is enabled or a logical unit number for which access is disabled for each of the received second identification numbers.

* * * * *